United States Patent [19]

Schütz

[11] Patent Number: 5,307,767
[45] Date of Patent: May 3, 1994

[54] INTERNAL COMBUSTION ENGINE AIR INTAKE SYSTEM

[75] Inventor: Berndt Schütz, Stuttgart, Fed. Rep. of Germany

[73] Assignee: Mercedes-Benz A.G., Stuttgart, Fed. Rep. of Germany

[21] Appl. No.: 60,915

[22] Filed: May 13, 1993

[30] Foreign Application Priority Data

May 28, 1992 [DE] Fed. Rep. of Germany ....... 4217630

[51] Int. Cl.$^5$ .............................................. F02B 27/00
[52] U.S. Cl. .................................................. 123/52 MB
[58] Field of Search ............... 123/52 MB, 52 M; 138/93

[56] References Cited

U.S. PATENT DOCUMENTS

| | | | |
|---|---|---|---|
| 4,231,329 | 11/1980 | Ishida | 123/52 MB |
| 4,368,698 | 1/1983 | Matsuo et al. | 123/52 MB |
| 4,402,297 | 9/1983 | Hyodo et al. | 123/52 MB |
| 4,473,038 | 9/1984 | Lorenzo | 123/52 M |
| 4,765,285 | 8/1988 | Kobayashi | 123/52 MB |
| 4,821,685 | 4/1989 | Matsushima et al. | 123/52 M |
| 4,858,569 | 8/1989 | Cser et al. | 123/52 MB |
| 4,901,680 | 2/1990 | Matsumoto | 123/52 MB |
| 5,048,470 | 9/1991 | Ford | 138/93 |

FOREIGN PATENT DOCUMENTS

| | | |
|---|---|---|
| 2203488 | 10/1988 | United Kingdom . |
| 2258496 | 2/1993 | United Kingdom . |
| 9113243 | 9/1991 | World Int. Prop. O. . |

Primary Examiner—Tony M. Argenbright
Assistant Examiner—M. Macy
Attorney, Agent, or Firm—Klaus J. Bach

[57] ABSTRACT

In an air intake system for an internal combustion engine having at least one cylinder with an intake pipe extending between the cylinder and an air collecting box for supplying intake air from the collecting box to the cylinder a diaphragm structure is arranged at the end of the intake pipe and includes an oscillation generator for providing acoustic pressure oscillations to the air in the intake pipe adapted to increase the cylinder air charge as a function of engine operating parameters and the intake air pipe is in communication with the air box via a connecting passage which includes a device for suppressing the acoustic pressure oscillations to prevent their transmission to the air in the air box.

6 Claims, 1 Drawing Sheet

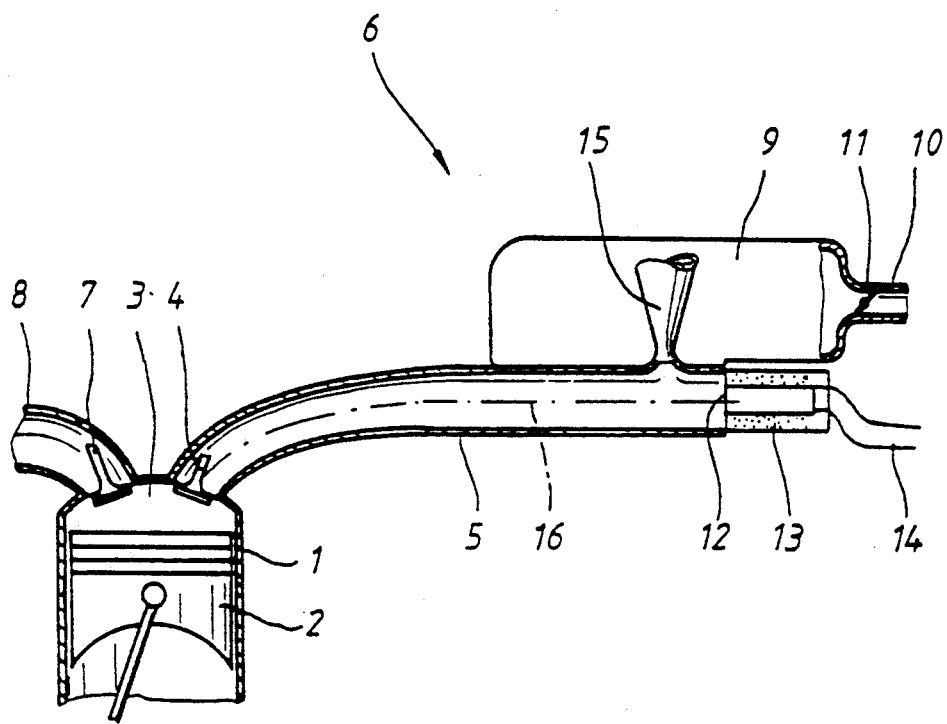

INTERNAL COMBUSTION ENGINE AIR INTAKE SYSTEM

BACKGROUND OF THE INVENTION

The invention relates to an air intake system for an internal combustion engine which improves the air charge of the individual cylinders of an engine.

In known intake systems, the length and cross-section of the individual intake pipes are configured in such a way that the respective cylinders are filled to an optimum degree at a particular engine speed by a resonance effect. Since this resonance effect disappears at different engine speeds, the only remaining possibility for achieving a supplementary charging effect is to impose the desired oscillation frequency on the air column in the intake pipes by means of an externally excited oscillation generator.

German DOS 3,729,998 discloses a cylinder charge control system in which an electromagnetically operated diaphragm is arranged in the transfer duct between the air filter box and the intake pipe. This diaphragm is controlled as a function of operating parameters in order to produce defined pressure oscillations in the intake pipe. The disadvantage in this arrangement is that the diaphragm is arranged in the transfer duct and, as a result, poses a considerable resistance to flow.

Also known, for example, from JP-A2 61-76 719, are intake systems in which a diaphragm is arranged in the outer wall of the air collecting box. But in multi-cylinder internal combustion engines such an arrangement can cause oscillations in the individual intake pipes which have negative effects on each other as it may happen in the arrangement described earlier.

The object of the invention is therefore to provide an intake system wherein predetermined acoustic pressure oscillations can be generated in the air columns in the individual intake pipes without interference between the air flows in the individual intake pipes.

SUMMARY OF THE INVENTION

In an air intake system for an internal combustion engine having at least one cylinder with an intake pipe extending between the cylinder and an air collecting box for supplying intake air from the collecting box to the cylinder a diaphragm structure is arranged at the end of the intake pipe and includes an oscillation generator for providing acoustic pressure oscillations to the air in the intake pipe adapted to increase the cylinder air charge as a function of engine operating parameters and the intake air pipe is in communication with the air box via a connecting passage which includes means for suppressing the acoustic pressure oscillations to prevent their transmission to the air in the air box.

With the intake system according to the invention independent acoustic pressure oscillations can be generated in each intake pipe without resulting in interference in the air collecting box. The means for suppressing acoustic pressure oscillations is preferably a venturi tube providing communication between the air collecting box and the intake pipe which guarantees oscillatory decoupling between the air intake box and the intake pipe and also provides for a supply of air with low flow resistance.

Further advantages of the invention will be apparent from the claims and the description.

BRIEF DESCRIPTION OF THE DRAWINGS

The sole figure is an illustrative embodiment of the invention showing schematically an intake system in cross-section.

DESCRIPTION OF A PREFERRED EMBODIMENT

As shown in the figure a cylinder 1 of an internal combustion engine (not shown in detail) includes a piston 2 which is movably disposed therein in the usual manner. Formed above the piston 2 is a combustion space 3 which is in communication via an intake valve 4 with an intake pipe 5 of an intake system 6 and via an exhaust valve 7 with an exhaust pipe 8. The intake system 6 comprises an air collecting box 9 which is supplied with fresh air via a conduit 10 in which is arranged a throttle valve 11. At the end opposite the intake valve 4, the intake pipe 5 is closed by a diaphragm 12. This diaphragm 12 can be vibrated with an adjustable frequency by an oscillation generator 13 supplied with energy via a supply lead 14. The diaphragm 12 can be operated in any desired manner, for example, electromagnetically or piezoelectrically.

As shown in the figure, communication between the air collecting box 9 and the intake pipe 5 is in the form of a venturi nozzle 15, the venturi nozzle 15 being attached to the intake pipe 5 at an angle to the longitudinal axis 16 of the intake pipe in the region of the diaphragm 12 in such a way that, on the one hand, the air can flow out of the air collecting box 9 into the intake pipe 5 against a low flow resistance but, on the other hand, acoustic decoupling between the individual intake pipes 5 and the air collecting box 9 is guaranteed. This is necessary in the case of multi-cylinder internal combustion engines in which a plurality of intake pipes 5 are supplied from a common air collecting box 9 in order to ensure that the oscillations in the individual intake pipes 5 do not influence each other via the common air collecting box 9. For noise damping, the walls of the air collecting box 9 and of the intake pipe 5 can additionally be lined with foam. Apart from the venturi nozzle 15, it is also perfectly possible to use other comparable means to connect the air collecting box 9 and the intake pipe 5. The figure shows the arrangement for one cylinder of a multi-cylinder engine wherein the remaining cylinders and intake systems are disposed behind one another.

Separate oscillation generators 13 may be used to operate the individual diaphragms 12 in each of the intake pipes 5. However, it is also conceivable to operate a plurality of diaphragms 12 by a common oscillation generator 13. It is of course advantageous to control the oscillation generators 13 as a function of operating parameters, for example the engine speed, by means of a control unit which adequately energizes the generators 13.

What is claimed is:

1. An air intake system for an internal combustion engine having at least one cylinder with an intake pipe extending between the cylinder and an air collecting box for supplying intake air to said cylinder, a diaphragm structure arranged at the end of said intake pipe remote from said cylinder so as to be capable of vibrating essentially in the longitudinal direction of said intake pipe and being operable by an oscillation generator attached thereto for exciting the air in said intake pipe so as to provide for acoustic pressure oscillations in said intake pipe suitable to increase the cylinder air charge as a function of engine operating parameters and a connecting passage for providing communication between said intake pipe and said air collecting box including means for suppressing said acoustic pressure oscillations to prevent their transmission to the air in said air collecting box.

2. An air intake system according to claim 1, wherein said connecting passage is formed as a venturi tube.

3. An air intake system according to claim 1 connected to a plurality of intake pipes with a plurality of diaphragms, wherein all diaphragms are excited by a common oscillation generator.

4. An air intake system according to claim 2, wherein a plurality of intake pipes are provided for a plurality of cylinders and the intake pipes are provided with individual diaphragms and individual oscillation generators.

5. An air intake system according to claim 4, wherein said air collecting box extends across all of said intake pipes, each of said intake pipes having an individual venturi pipe providing for communication with said air box.

6. An air intake system according to claim 5, wherein said venturi pipes extend into said air collecting box.

* * * * *